Patented May 24, 1938

2,118,511

UNITED STATES PATENT OFFICE 2,118,511

COATING COMPOSITIONS AND PROCESS OF PREPARING SAME

Robert T. Hucks, South River, N. J., assignor to E. I. du Pont de Nemours & Company, Wilmington, Del., a corporation of Delaware No Drawing. Application February 10, 1933, Serial No. 656,153

5 Claims. (Cl. 134—59)

This invention relates to blue coating compositions and to a method of preparing the same and, more particularly, to cellulose derivative coating compositions comprising blue iron ferrocyanide pigments.

The blue pigments to be considered in the present improved process for incorporation in coating compositions, and particularly in cellulose derivative enamels, are produced by precipitation, generally from water solution. After precipitation, the pigment is separated from the aqueous liquid by means of filtration, usually in a filter press. The filter press cake usually contains about 25–75% water and about 75–25% pigment. Ordinary blue iron ferrocyanide pigments contain in the press cake approximately 25% pigment to 75% water. This is subsequently dried and ground to as fine a state as possible. However, during the drying process many of the small particles of the pigment become cemented together, forming agglomerates which are not readily broken up. The final grinding and sifting reduce these pigment aggregates to some extent but not to the degree required to provide acceptable cellulose derivative coating compositions in which the pigment is finally to be used. The problem is therefore to find a further treatment of the pigment to reduce or eliminate the aggregates, which, if not broken down and suitably dispersed, will cause the resulting enamel to be characterized by a dirty color and an undesirable red tone. Other properties, such as gloss and color depth, are seriously impaired and an appreciable amount of grit, frequently present under these conditions, further makes the product of inferior quality.

There are three common types of iron ferrocyanide pigments, apparently identical in chemical composition, but varying in shade. These are designated as Prussian blue, Milori blue, and Chinese blue. This invention is applicable to all iron blues, but more particularly to Chinese blue. These iron blues are characterized by a reddish cast when made up in film coating compositions. For some systems, such as are found in the printing ink industry, this phenomenon is at times desirable. In protective and decorative finishes, especially in lacquers for automobiles, this off color is highly objectionable. The finished surface has a reddish brown appearance, especially when viewed obliquely under strong illumination. This initial reddish tone is to be differentiated from the bronze that appears as a chalk at the film surface during exposure to the elements. Chinese blue is reputed to be as free from a red cast as possible and is the grade used by lacquer manufacturers in preparing high grade blue lacquers for the automotive industry, but even this is far from being satisfactory.

The method commonly employed in manufacturing blue nitrocellulose enamels, based on iron ferrocyanide pigments, comprises the grinding of the pigment in a ball mill in the presence of certain plasticizers or softeners, or mixtures thereof, with or without the addition of solvents or diluents. In some cases improvements are secured by grinding the pigment in a resin solution, since this type of material frequently exhibits superior pigment wetting properties. In other instances, a combination of these several ingredients, even to the use of a small quantity of nitrocellulose, may be used.

This invention has as an object a process of preparing blue enamels of superior color, hitherto unobtainable. A further object is the elimination of the dirty color and objectionable red tone. A still further object is a process whereby more complete dispersion of the pigment is obtained. Further objects will appear hereinafter.

These objects are accomplished by the following invention wherein the blue iron ferrocyanide pigment is ground with a blown oil, preferably blown castor oil, and preferably with the addition of zinc oxide, before incorporation into the cellulose derivative lacquer.

The process of the invention is exemplified in the following examples:

Example 1

*Mill base-Chinese blue*

| | Per cent |
|---|---|
| Chinese blue (ferric ferrocyanide blue) | 30 |
| Blown castor oil | 12 |
| Solvent softener | 18 |
| Resin | 14 |
| Alcohol (denatured) | 15 |
| Diluents | 11 |
| | 100 |

This composition may be conveniently ground in a laboratory ball mill with a steel ball ratio of approximately three parts by weight of ⅜" to ⅝" diameter steel balls to one part by weight of the mill base. A grinding cycle of about 72 hours is satisfactory. Pyroxylin and additional solvents are then mixed with this composition by methods well known in the art in proportions to give a final composition of:

*Final composition*

| | Per cent |
|---|---|
| Mill base (as above) | 20.0 |
| Pyroxylin | 11.0 |
| Alcohol (denatured) | 16.5 |
| Solvents | 26.2 |
| Diluents | 26.3 |
| | 100.0 |

Example 2

*Mill base-Chinese blue*

| | Per cent |
|---|---|
| Chinese blue (ferric ferrocyanide blue) | 30 |
| Zinc oxide | 3 |
| Blown castor oil | 12 |
| Solvent softener | 18 |
| Resin | 14 |
| Alcohol (denatured) | 15 |
| Diluents | 8 |
| | 100 |

The same steel ball ratio and grinding cycle indicated in Example 1 are satisfactory. Pyroxylin and additional solvents are then mixed with this composition by methods well known in the art in proportions to give a final composition of:—

*Final composition*

| | Per cent |
|---|---|
| Mill base (as above) | 20.0 |
| Pyroxylin | 11.0 |
| Alcohol (denatured) | 16.5 |
| Solvents | 26.2 |
| Diluents | 26.3 |
| | 100.0 |

This composition differs from that of Example 1 in that approximately 10% of zinc oxide, based on the iron blue, is added. This results in an additional improvement of approximately 50% in tone, the red cast being practically eliminated. This further improvement represents the preferred embodiment of this invention, due to the excellent color of the enamels which may thereby be made.

Example 3

*Mill base-Chinese blue*

| | Per cent |
|---|---|
| Chinese blue (ferric ferrocyanide blue) | 30 |
| Zinc oxide | 2 |
| Blown castor oil | 12 |
| Solvent softener | 18 |
| Resin | 14 |
| Alcohol (denatured) | 15 |
| Diluents | 9 |
| | 100 |

The same steel ball ratio and grinding cycle as indicated for Example 1 is likewise used here.

Again as in Example 1, pyroxylin and other ingredients are added according to well known methods to give a final composition as follows:

*Final composition*

| | Per cent |
|---|---|
| Mill base (as above) | 20.0 |
| Pyroxylin | 11.0 |
| Alcohol (denatured) | 16.5 |
| Solvents | 26.2 |
| Diluents | 26.3 |
| | 100.0 |

This example is identical with Example 2 in composition, with the exception of the variation in the quantity of zinc oxide. The resulting composition does not have quite as desirable color as does that of Example 2.

Example 4

*Mill base-Chinese blue*

| | Per cent |
|---|---|
| Chinese blue (ferric ferrocyanide blue) | 30 |
| Zinc oxide | 3 |
| Blown cottonseed oil | 12 |
| Solvent softener | 18 |
| Resin | 14 |
| Alcohol (denatured) | 15 |
| Diluents | 8 |
| | 100 |

The same steel ball ratio and grinding cycle as indicated for Example 1 likewise holds here.

Again as in Example 1, pyroxylin and other ingredients are added according to well known methods to give a final composition as follows:

*Final composition*

| | Per cent |
|---|---|
| Mill base (as above) | 20.0 |
| Pyroxylin | 11.0 |
| Alcohol (denatured) | 16.5 |
| Solvents | 26.2 |
| Diluents | 26.3 |
| | 100.0 |

This example is identical with Example 2 in composition, with the exception that the blown castor oil of Example 2 has been replaced by blown cottonseed oil.

Blown oils, and particularly blown castor oil, when used in the manner above described, greatly improve the color of enamel films, and particularly nitrocellulose enamel films employing iron ferrocyanide blue pigments. This improvement lies in the elimination of the dirty appearance and the substantial reduction of the red tone so commonly encountered in finishes based on these pigments. The modification employing zinc oxide is particularly efficacious in cleaning up the color, although also contributing materially to the elimination or reduction of the pronounced red tone characterizing cellulose derivative enamel films, and particularly nitrocellulose enamel films manufactured from these pigments, where blown oils and zinc oxide are not used.

Other oils, for example, blown soya bean oil, blown rapeseed oil, blown Chinawood oil, blown linseed oil, blown sunflower seed oil, and the like, may be used. In general, any blown drying oil or blown semi-drying oil is operative, although blown castor oil is by far more effective than are the other blown oils. This type of oil is produced by blowing with air, with or without heat, or by other methods known in the art, which will produce oils of like nature. The degree of blowing may vary, thus in the case of castor oil, samples have been found to be effective after being blown to such varying extents that their viscosity ranges from 200–3000 poises. For example, an oil blown to a viscosity of 350 poises and one blown to a viscosity of 2470 poises were effective, the one blown to a viscosity of 350 poises being preferred. In general, any oil blown to a substantial extent is operative. The viscosities indicated are determined according to well known methods by means of a MacMichael viscometer, or similar instrument.

The proportion of blown oil recited in the examples is preferred, although satisfactory results are likewise obtained by using greater or less quantities. If very small quantities are used, the improvements in color are not so noteworthy. If relatively large quantities of the blown oil are used, the color improvement is excellent but the resulting enamel film is usually too soft for general finishing purposes. In the examples, blown castor oil has replaced part of the normal plasticizer content. In some cases the blown oil may be entirely substituted for the plasticizer in the composition. The ratio may, of course, vary over a considerable range, depending upon the film properties desired, and for most purposes, the plasticizer content may vary from about ½ to ⅓ of the nitrocellulose content, some deviation from these limits being allowed to afford desirable compositions for specific purposes.

In the examples the zinc oxide is given as 2 or 3 parts per 30 parts of iron blue. In general, a ratio of zinc oxide to iron blue of 1–10 is preferred. At least 1% by weight of zinc oxide based on the iron blue must be present. More than 10% results in a decrease in the tinting strength of the composite iron blue pigment. For certain purposes this is not objectionable and the zinc oxide content may be increased much above 10%, for example, in the preparation of light blue coating compositions. For tinting solutions the zinc oxide content should not be more than 10% by weight of the iron blue, lest its basic color value be impaired.

The examples disclose coating compositions containing nitrocellulose and the improved pigment. Other cellulose derivatives, such as ethyl cellulose, benzyl cellulose, and other cellulose ethers, may be employed. Cellulose acetate and other organic esters of cellulose may be employed with some sacrifice of compatibility in the resulting enamels.

The term "solvent softener" as used in the examples describes the group of cellulose derivative plasticizers which are also considered to have solvent action on the cellulose derivative, such as are exemplified by dibutyl phthalate, tricresyl phosphate, diethyl phthalate, dibutyl tartrate, triacetin, et cetera. The solvent softener should be chosen from the group of those especially adapted to the particular cellulose derivative employed.

The "resin component" as used herein may include natural resins such as damar, ester gum, elemi, Congo, et cetera, as well as synthetic resins such as polyhydric alcohol-polybasic acid resins, phenol-formaldehyde resins, vinyl resins (vinyl acetate and/or vinyl chloride), toluene sulfonamide-formaldehyde resins, and the like, and such resins modified by the reactants well known in the art.

The "solvents" as used in this application play no particular part in the success of the invention and may comprise any of the well known cellulose derivative solvents suited to the particular cellulose derivative employed, for example, in the case of nitrocellulose, ethyl acetate, butyl acetate, pentacetate, et cetera.

"Diluents" may include alcohols, toluol, naphtha, and their equivalents.

With regard to the grinding operation, the duration of the grinding cycle indicated in the examples is not to be considered a limitation, since this factor may be varied over wide ranges without materially detracting from the improvements obtained in practicing the invention. This holds true for the steel ball ratio disclosed above, since this may likewise be varied without adversely affecting the improvements resulting from the modified process described.

Although a ball mill grinding process is preferred, it will be understood that other methods of dispersing pigments, as practiced in the production of cellulose derivative enamels and particularly nitrocellulose enamels, are not precluded. For example, the standard colloid rolls or buhr mills may be used, or, if preferred, kneading machines.

The enamels prepared according to the present process may be used as such, or for tinting purposes, that is, to impart the desired blue tone to lacquers of other colors. These lacquers may be used over wood, metal, and, in general, in all applications wherein lacquers are used. They are of particular utility over metal.

In earlier practice, raw castor oil has been widely used as a softener in nitrocellulose enamels. Blue enamels based on the particular pigments noted above, when used in nitrocellulose vehicles utilizing this softener, are quite deficient in desirable color properties and show a decidedly dirty and red appearance. The improvements afforded by replacing raw castor oil by blown castor oil, and particularly with the addition of zinc oxide in the grinding operation, are pronounced in comparing finishes based on the older art using raw castor oil and without zinc oxide, with the new finish, where valuable, unique, and unexpected results are obtained, in the elimination of the red tone and dirty color and in the improvement in gloss and color depth of the enamel.

Color improvements as described are perhaps more clearly apparent when the blue enamel is "let-down" or mixed with considerable quantities of a white pyroxylin enamel using zinc oxide as a pigment in substantially the same vehicle as described in Example 1. In this instance, the color improvement resulting from the use of blown castor oil, together with zinc oxide in the grinding, is more pronounced and therefore more readily discernible. The invention provides a simple and economical method of securing much desired improvements in the art without requiring new and expensive equipment, or the use of any complex technique or deviation from present technique in practicing the process.

As many apparently widely different embodiments of this invention may be made without departing from the spirit and scope thereof, it is to be understood that the invention is not limited to the specific embodiments thereof except as defined in the appended claims.

I claim:

1. The process of reducing the reddish cast of iron ferrocyanide blue pigments which comprises the step of grinding the pigment with blown castor oil.

2. The process of reducing the reddish cast of iron ferrocyanide blue pigments which comprises grinding the blue pigment with about 1 to 10% of zinc oxide with blown castor oil.

3. A blue ferrocyanide pigment composition free from reddish cast comprising blown castor oil intimately associated with the said pigment.

4. A blue pigment composition free from reddish cast which comprises iron ferrocyanide blue and about 1 to 10% by weight of zinc oxide based on the blue pigment, and a blown vegetable oil selected from the class consisting of castor oil, semi-drying oils, and drying oils intimately associated therewith.

5. A blue pigment composition free from reddish cast which comprises an iron ferrocyanide blue pigment intimately associated with a blown vegetable oil selected from the class consisting of castor oil, semi-drying oils, and drying oils.

ROBERT T. HUCKS.